(No Model.)
E. GROVER.
COMPUTING SCALE.
No. 580,614.
Patented Apr. 13, 1897.
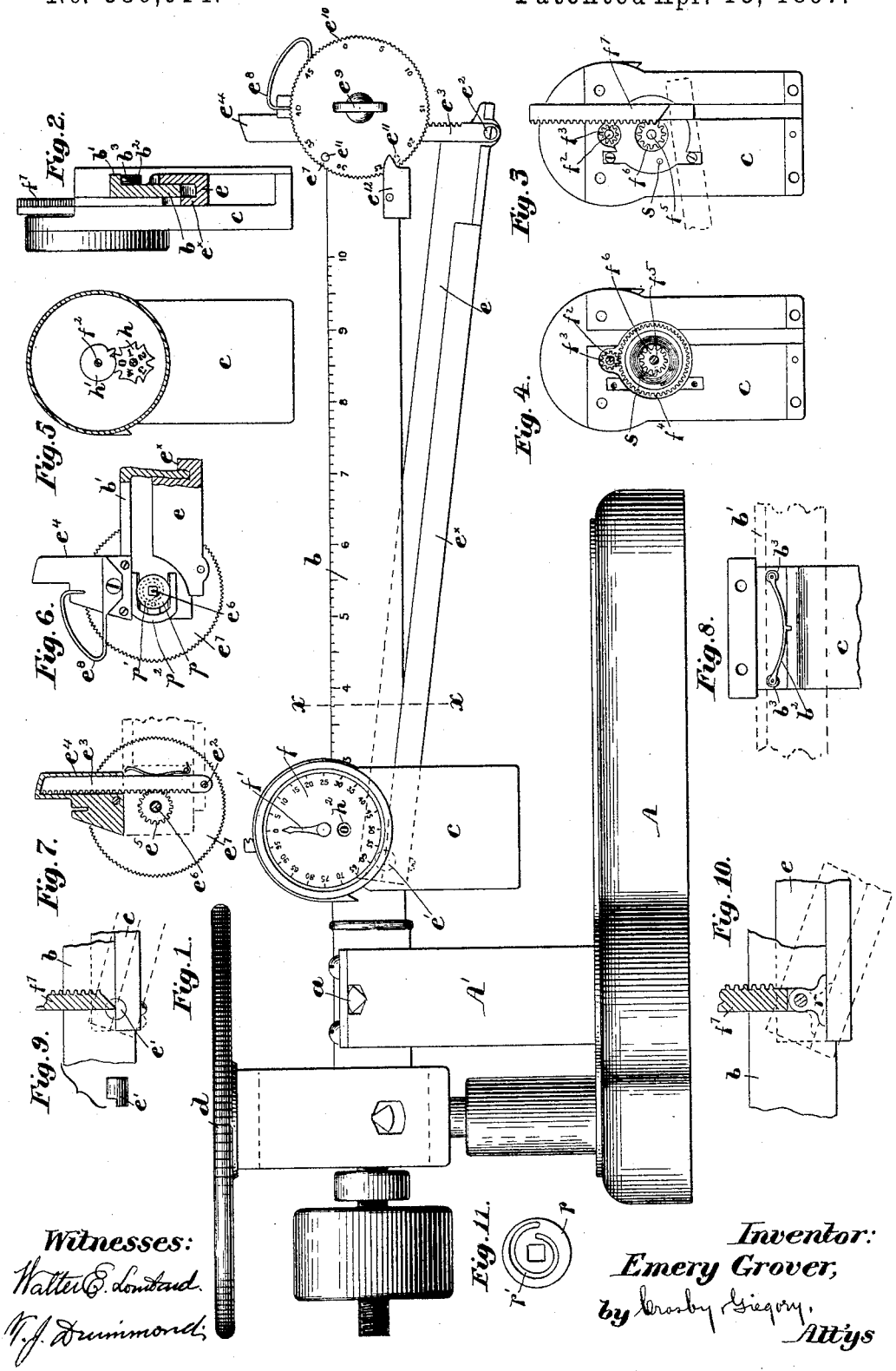
Witnesses:
Walter E. Lombard
W. J. Drummond
Inventor:
Emery Grover,
by Crosby Gregory,
Attys

UNITED STATES PATENT OFFICE.

EMERY GROVER, OF NEEDHAM, MASSACHUSETTS.

COMPUTING-SCALE.

SPECIFICATION forming part of Letters Patent No. 580,614, dated April 13, 1897.

Application filed February 10, 1896. Serial No. 578,631. (No model.)

*To all whom it may concern:*

Be it known that I, EMERY GROVER, of Needham, county of Norfolk, and State of Massachusetts, have invented an Improvement in Computing-Scales, of which the following description, in connection with the accompanying drawings, is a specification, like letters on the drawings representing like parts.

This invention in computing-scales has reference to beam-scales as distinguished from spring-balance scales, the object of my invention being to provide a simple and accurate computing mechanism which is applicable to the beam type of scales.

In the drawings, Figure 1, in side elevation, shows a beam-scale containing one embodiment of my invention; Fig. 2, a cross-section on the dotted line $x\,x$, Fig. 1, looking to the left; Fig. 3, a rear side view of the poise with the back plate removed to expose some of the working parts; Fig. 4, a similar view with the other parts exposed; Fig. 5, a view looking at the front of the poise with the face-plate removed; Fig. 6, a rear side view of the controlling device for adjusting the angular member, and Fig. 7 a sectional detail showing several of the parts of said controlling device. Fig. 8 is a detail view of one form of retaining device for the poise to be described; Fig. 9, a detail partial section showing one means for supporting the rack $f^7$ on the angular member; Fig. 10, a detail partial section showing another means for supporting the rack $f^7$ on the angular member, and Fig. 11 a detail looking at the rear side of the balancing-cam.

In the embodiment of my invention herein selected for illustration and shown in the drawings, A is a base upon which is erected a suitable standard A', in which is fulcrumed at $a$ the weighing member $b$, (shown as a typical beam,) the same at one side its fulcrum being adapted to receive the adjustable poise $c$ and at the opposite side its fulcrum connected with, and in the present instance supporting, the weighing table or platen $d$.

In accordance with my invention I have arranged in proper relation to the fulcrumed weighing member $b$ the angular member $e$, shown as adjustable and connected at one of its ends with the weighing member by a suitable joint or pivot $e'$ (see Fig. 9) and at its opposite end suitably connected with a controlling device for determining its angular position, said member $e$ in the present instance having jointed to its free end at $e^2$ a rack $e^3$, adapted to slide vertically in a suitable guideway $e^4$ on the end of the weighing member and meshing with a pinion $e^5$ on an arbor $e^6$, journaled in the end of said weighing member or in bearings carried thereby, rotation of said pinion acting through the said rack to vary the angular position of the member $e$ relatively to the weighing member.

To control the rotation of the pinion $e^5$, I have herein mounted upon the pinion-arbor a suitable disk $e^7$, shown as notched at its periphery for engagement with the spring or other suitable click or stop-pawl $e^8$, which serves to hold the disk $e^7$ in desired adjusted position without interfering with the manual rotation of said disk for adjustment of the angular member.

The arbor $e^6$ is shown as provided with a suitable handle $e^9$, by which to rotate it and its disk and pinion referred to, and said disk is preferably provided on its face with suitable indicating-characters $e^{10}$, running from "0" to any desired figure, herein "45," and representing the number of cents per unit of weight and constituting the price-selecting device.

The stop-pin $e^{11}$ on the disk $e^7$ coöperates with a stop-surface $e^{12}$ on the weighing member to limit the rotation of the disk and the adjustment of the angular member.

The poise $c$, adapted to be moved along the weighing member, which latter is graduated, as usual, to indicate pounds and fractions thereof, is in the present embodiment of my invention provided with a computing mechanism, the same comprehending a dial $f$, graduated in suitable manner herein to indicate cents from one to one hundred and provided with a suitable pointer $f'$, mounted on a staff $f^2$, journaled in suitable bearings in the poise and provided at its rear end with a pinion $f^3$ in mesh with a larger pinion or wheel $f^4$ on a staff $f^5$, which latter is in turn provided with a pinion $f^6$ in mesh with a vertically-sliding rack $f^7$, arranged in suitable guideways in the poise and adapted to rest upon or be supported at its lower end by the angular member $e$.

A spring $s$, Fig. 4, encircling the staff $f^5$ and connected therewith and with the poise, acts to press the rack $f^7$ constantly down upon and to follow the downward inclination of the angular member $e$, although the weight of the rack $f^7$ would itself be sufficient, the spring being provided to insure greater certainty.

The operation of the scale is as follows, viz: When the adjustable angular member $e$ is by the handle $e^9$ of the controlling device raised into a position truly parallel with the weighing member, the computing-pointer $f'$ on the poise will be unmoved. If, however, it is desired to fix the price at forty cents per unit, the handle $e^9$ is turned to rotate the disk $e^7$ until the figure "40" on the said disk registers with the stop-pawl $e^8$, as in Fig. 1, thereby dropping the free end of the angular member $e$ into a position at an angle with relation to the line of movement of the poise on the weighing member, so that as the poise is thereafter moved outwardly on the weighing member to balance the weight of the article being weighed and placed upon the table $d$ the rack $f^7$ on the poise will follow the inclination of the angular member $e$ and will thereby, through the gearing referred to, cause the computing-pointer $f'$ to move for a greater or less distance over its dial $f$ and register or indicate the aggregate price or cost of the article being weighed.

It is evident, of course, that the poise may be moved outwardly on the weighing member until the article to be weighed is balanced and the angular member $e$ thereafter moved into desired angular position, according to the desired price per pound, (indicated by the disk $e^7$,) and the computing mechanism will be operated in precisely the same manner as though the price were fixed before the poise is moved.

In the present embodiment of my invention the dial $f$ contains graduations up to one dollar only, and to indicate whole amounts in excess of one dollar I have provided at the back of the dial a Geneva-stop movement, (shown in Fig. 5,) in which the star-wheel $h$, actuated by the driving-wheel $h'$ on the staff $f^2$, is provided with figures, in the present instance from "1" to "4," which are successively exposed at an opening $h^2$ in the dial on successive complete rotations of the pointer $f'$.

In the embodiment of my invention herein shown the weighing member $b$ is shown as provided with a rearwardly-extended flange $b'$ along its upper edge, and the poise which rests upon the weighing member and also embraces the angular member is provided with a retaining device, (shown as a spring $b^2$,) carrying rollers $b^3$ at its end, which travel in contact with the under side of this flange $b'$, thereby holding the poise always in correct alined position.

The angular member $e$, as herein shown, is constructed to embrace the weighing member (see Fig. 2) when the two are closed one against the other, the surface along which the rack $f^7$ travels and upon which it is supported being herein shown as the upper edge of the flange $e^\times$ at the front of the angular member $e$.

Referring to Fig. 9, I have pointed the end of the rack $f^7$ on the poise, so that its point, which is the point of support of the rack, may be moved into position coincident with the axis of the pivot $e'$, on which the angular member is adjusted, said pivot being halved, as shown in Fig. 9, to enable the said rack-point to be moved into such coincident position.

The rack, which is but one form of actuator for the computing mechanism, need not contact directly with the angular member, as in the construction Figs. 1 to 9, but may be otherwise controlled thereby, as, for example, jointed to a shoe $r$, (see Fig. 10,) which latter slides on the angular member. The axis of the joint connecting the rack and shoe should, however, be such as would in at least one position coincide with the axis on which the angular member is adjusted.

In practice I have found that as the members $b$ $e$ are separated the adjustment or balance of the scale is apt to be slightly changed, and to correct this my invention comprehends the automatic adjustment of the scale-balancing properties by suitable means to maintain the scale always in correct condition of adjustment and balance for use.

In the present instance of my invention I have arranged at the back of the disk $e^7$ and upon the arbor thereof a cam $p$, having a spiral groove $p'$, (see Fig. 11,) which receives a suitable roller or stud on the balancing member $p^2$, shown as mounted to slide in suitable guides on the weighing member $b$. When the disk $e^7$ is rotated to vary the separation of the members $b$ and $e$, the cam $p$ automatically moves said balancing member $p^2$ away from or toward the fulcrum $a$ of the weighing member to preserve at all times a correct balancing of the parts.

It will be seen that in the embodiment of my invention shown the computing mechanism is carried by and movable with the poise, while the adjustable angular member is mounted upon and movable with the fulcrumed weighing member or beam, the whole presenting a simple and perfectly accurate construction which can be added to the ordinary beam at a relatively small expense.

My invention is not limited to the particular embodiment herein shown, for it is evident the same may be varied in many respects and applied to all forms of beam-scales without departing from the spirit and scope of my invention.

Having fully described my invention without limiting myself as to details, what I claim, and desire to secure by Letters Patent, is—

1. In a computing-scale, the combination with a weighing member having a laterally-extended flange, computing mechanism, an angular member and means to adjust the same, connections between said angular member and said computing mechanism, of a poise arranged to slide on said weighing member, and a retaining device acting against one side of said flange to hold said poise in proper alined position, substantially as described.

2. In a computing-scale, the combination with a weighing member adapted to be moved under the action of the article being weighed; an adjustable angular member and computing mechanism controlled thereby and a balancing member and means to automatically move the same to insure proper balancing of parts whatever the relative position of the said parts, substantially as described.

3. In a computing-scale, the combination with a weighing member adapted to be moved under the action of the article being weighed; an angular member; controlling means to adjust the angular position of said angular member; computing mechanism; controlled by said angular member; and a balancing member and connections between the same and said controlling means for automatically moving the former by the latter, substantially as described.

4. In a computing-scale, the combination with weighing mechanism; computing mechanism and an intermediate movable member governing the operation of one of said mechanisms by or from the other, and an adjusting device for said intermediate member, of a balancing member connected with and to be moved by said adjusting device, substantially as described.

5. In a computing-scale, the combination with a weighing member, of an angular member carried thereby; a computing mechanism having a part coöperating with said angular member, and means independent of said angular member to hold said part in operative contact with said angular member to determine from the latter the movement of said computing mechanism, substantially as described.

6. In a computing-scale, the combination with a weighing member, of an angular member carried thereby; a computing mechanism having a part coöperating with said angular member to determine the computation, and means independent of said angular member to press said part into position determined by said angular member during the ordinary weighing operation, substantially as described.

7. In a computing-scale, the combination with a fulcrumed weighing member, and a poise suspended and movable thereon, of an angular member carried by and beneath said weighing member, and a computing mechanism having a part movable with said poise and coöperating with and determined as to its position by said angular member, substantially as described.

In testimony whereof I have signed my name to this specification in the presence of two subscribing witnesses.

EMERY GROVER.

Witnesses:
 FREDERICK L. EMERY,
 THOMAS J. DRUMMOND.